Jan. 3, 1950     A. C. THORNTON     2,493,275
DRIVE TRANSMISSION FOR AUTOCYCLES
Filed Aug. 29, 1946
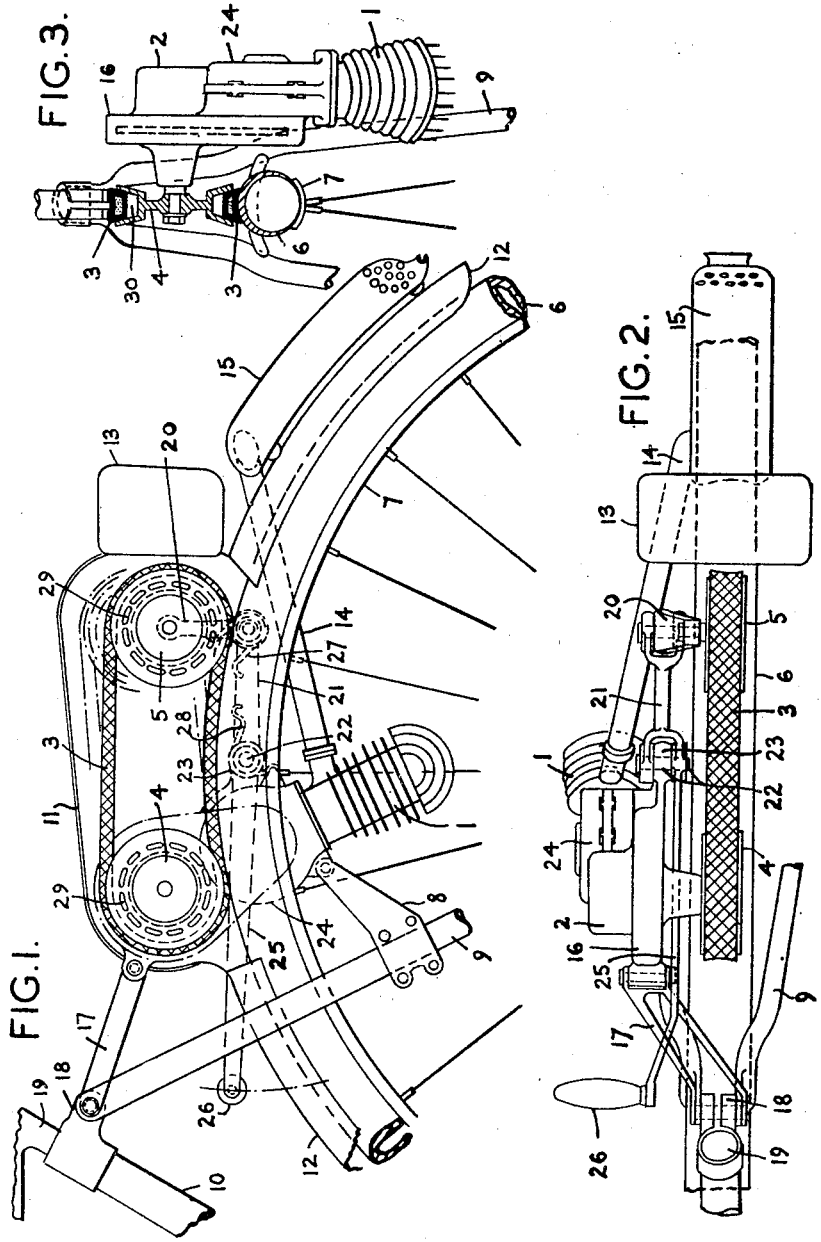

Patented Jan. 3, 1950

2,493,275

UNITED STATES PATENT OFFICE 2,493,275

DRIVE TRANSMISSION FOR AUTOCYCLES

Arthur Cyril Thornton, Yeadon, England

Application August 29, 1946, Serial No. 693,687
In Great Britain February 8, 1946

7 Claims. (Cl. 180—33)

This invention relates to driving mechanism for cycles, auto-cycles and the like, particularly to the final drive or transmission mechanism. Hitherto the usual method of transmitting the drive to the road wheel has been by chain and sprocket gearing or by a shaft drive and suitable bevel gearing or by a roller in contact with the tire. It has also been proposed to propel cycles and other like vehicles by petrol or like motors through the medium of a pair of driving wheels having a belt running around them arranged to act directly on the periphery of the cycle wheel at two or more points, or over a lengthened arc so as to give a certain drive without harming the tire. The chief object of the present invention is to provide a new or improved method of driving a cycle, auto-cycle or the like utilizing an endless belt in frictional contact with the tire.

According to the invention the drive from the engine and/or gearbox is transmitted on to the outer, inner or side of the road wheel or tire adjacent to the periphery thereof by means of an endless flexible V-belt drive. The endless V-belt drive will be adapted to contact an arc of the wheel or tire and may be of rubber, canvas or similar material suitably treated to withstand the effects of weather, oil, grease and the like and the pulleys carrying the V-belt may be spring loaded to maintain the correct tension of the V-belt and a frictional contact with the periphery of the tire. Also the belt may be fabricated from a single strip of flexible material or be built up of a plurality of links and the driving surface of the belt contacting the road wheel or tire may be sectionally contoured to enhance the friction between the contacting surfaces.

In order that the invention may be clearly understood and readily carried into effect the same will now be more fully described with reference to and by aid of the accompanying drawings, wherein—

Figure 1 is an elevation partly sectional showing a method of mounting the engine and driving mechanism relative to the rear wheel of a cycle;

Figure 2 is a plan of Figure 1; and

Figure 3 is a part end view of Figure 1.

Referring to the drawings, the drive from the engine 1 is taken through a clutch 2 to a flexible endless V-belt 3 rounted around a driving pulley 4 and an idler pulley 5. The belt 3 is maintained in frictional contact with a portion of the periphery of the tire 6 on the road wheel 7 of the cycle. The engine 1 is inverted and secured by means of a bracket 8 to the rear fork stay 9 of the cycle frame 10. The driving mechanism is encased in a sheet metal housing 11 which may be attached to or form part of the rear mudguard 12 whilst attached to the housing 11 at the rear thereof may be the petrol tank 13. The engine 1 will preferably be of the small capacity two-stroke type, air cooled and rigidly mounted as aforementioned with the exhaust pipe 14 passing rearwardly to a silencer 15 carried on the rear mudguard 12.

The engine transmission casing 16 will be secured to the frame of the cycle 10 by means of an off-set link 17 attached to a lug 18 immediately behind the seat pillar 19. The idler pulley 5 is carried on a short arm 20 pivoted to a further short arm 21 fulcrumed at 22 to a lug 23 on the crank case 24 of the engine 1 and rigidly attached to or formed as an extension of said further short arm 21 is a longer arm 25 provided with a projecting handle 26. The short arm 20 is spring loaded relative to the further short arm 21 by a spring 27 in such a manner that the idler pulley 5 is continually being forced away from the driving pulley 4 to maintain the correct tension of the belt 3. The further short arm 21 is also spring loaded by means of the spring 28, one end of which engages the crankcase 24 or lug 23 on the engine 1 to force the further short arm 21 downwards and maintain the belt 3 in frictional contact with the tire 6. Downward movement of the handle 26 raises the idler pulley to clear the belt 3 from the tire 6 when it is desired to place the driving mechanism out of action. Both the driving pulley 4 and the idler pulley 5 are V-groove pulleys and the driving belt 3 is also of V-type preferably as shown in Figure 3.

The driving and idler pulleys 4 and 5 respectively are both slotted at 29 in the side of the flanges to provide exits for any dirt or liquid which may enter the pulley grooves 30.

As shown the belt drive and associated pulleys are placed to one side of the engine and driving mechanism (see Figure 2) so that freedom is provided for the attachment and removal of the belt 3. The driving and idler pulleys, particularly their flanges or grooves may be contoured or grooved to mate with similar configurations, contours, grooves or flutings on the inner and mating surfaces of the driving belt. If desired the outer or driving surface of the belt 3 may be treaded or contoured to increase the driving friction between the belt and the periphery of the tire.

It will be seen that this invention provides a simple and effective method of driving a lightweight motorised cycle such as an auto-cycle without necessitating the use of chains and sprockets to the road wheel as with present constructions, and a driving unit capable of being attached to and drive the periphery of either the front or rear wheel of a pedal cycle with a minimum of alteration to the cycle.

What I claim is:

1. In a driving mechanism for a cycle, wherein a drive from the engine is transmitted to the road wheel adjacent the periphery thereof by means of an endless flexible belt drive, an inverted engine rigidly secured to the cycle frame and arranged within the periphery of the road wheel, said cycle frame having mounted thereon a driving V-grooved pulley and a spaced idler V-grooved pulley, an endless V-belt drive engaging said pulleys and arranged to contact an arc of the wheel between said pulleys, means operatively connecting the engine to said driving pulley, means for adjusting the idler pulley relative to the driving pulley, and means operatively connected to the idler pulley for moving the belt out of contact with the wheel without movement of the engine.

2. A driving mechanism for a cycle according to claim 1, in which the cycle has a rear mudguard and the driving mechanism and transmission are encased in a sheet metal housing attached to the rear mudguard.

3. A driving mechanism for a cycle according to claim 1, in which the cycle has a crank case and an idler pulley is carried on a short arm pivotally attached to a further arm fulcrumed on the crank case and having attached thereto a longer arm having a handle projecting from the forward end of said arm, whereby the driving mechanism can be placed out of action without movement of the engine.

4. A driving mechanism for a cycle according to claim 1, in which the cycle has a rear mudguard and a crank case and the driving mechanism is encased in a sheet metal housing forming part of the rear mudguard, the idler pulley is carried on a short arm pivotally attached to a further arm fulcrumed on the crank case and having formed as an extension thereof a longer arm having a handle projecting from the forward end of the said arm, whereby the driving mechanism can be placed out of action without movement of the engine, the short arm of the idler pulley being spring loaded relative to the further arm so that the said idler pulley is continually being forced away from the driving pulley to maintain the belt in tension.

5. A driving mechanism for a cycle according to claim 1, in which the cycle has a crank case and an idler pulley is carried on a short arm pivotally attached to a further arm fulcrumed on the crank case and having attached thereto a longer arm having a handle projecting from the forward end of the said arm, whereby the driving mechanism can be placed out of action without movement of the engine, the further arm being spring loaded relative to the crank case of the engine so that the idler pulley is pulled towards the tire to maintain the belt in frictional contact therewith.

6. A driving mechanism for a cycle according to claim 1, in which the cycle has a crank case and an idler pulley is carried on a short arm pivotally attached to a further arm fulcrumed on the crank case and having attached thereto a longer arm having a handle projecting from the forward end of the said arm, whereby the driving mechanism can be placed out of action without movement of the engine, the short arm of the idler pulley being spring loaded relative to the further arm so that the said idler pulley is continually being forced away from the driving pulley to maintain the belt in tension, the further arm being spring loaded relative to the crank case of the engine so that the idler pulley is pulled towards the tire to maintain the belt in frictional contact therewith, depression of the long arm by means of its handle being adapted to raise the idler pulley and its endless belt clear of the wheel without moving the engine.

7. A driving mechanism for a cycle according to claim 1, in which flanges are provided on the driving and idler pulleys, said flanges being slotted to provide exits for any dirt or liquid which may enter the pulley grooves.

ARTHUR CYRIL THORNTON.

REFERENCES CITED

The following references are of record in the file of this patent:

UNITED STATES PATENTS

| Number | Name | Date |
|---|---|---|
| 715,889 | Smith | Dec. 16, 1902 |
| 928,928 | Belz | July 27, 1909 |
| 1,158,311 | Schunk | Oct. 26, 1915 |
| 1,503,935 | Baker | Aug. 5, 1924 |
| 2,328,233 | Schunk | Aug. 31, 1943 |